United States Patent
Fuss et al.

(10) Patent No.: US 6,868,174 B2
(45) Date of Patent: Mar. 15, 2005

(54) ANTI-COUNTERFEIT DETECTION FOR LOW END PRODUCTS

(75) Inventors: William A. Fuss, Rochester, NY (US); Zhigang Fan, Webster, NY (US)

(73) Assignee: Xerox Corporation, Stamford, CT (US)

(*) Notice: Subject to any disclaimer, the term of this patent is extended or adjusted under 35 U.S.C. 154(b) by 639 days.

(21) Appl. No.: 09/725,399

(22) Filed: Nov. 29, 2000

(65) Prior Publication Data

US 2002/0064304 A1 May 30, 2002

(51) Int. Cl.⁷ .................................................. G06K 9/00
(52) U.S. Cl. ................................................... 382/135
(58) Field of Search ........................ 382/135, 137, 382/310, 317; 194/206, 207; 358/3.28, 462, 443, 452, 453; 340/10.1, 10.42, 10.6; 705/62; 700/227; 715/527; 380/51

(56) References Cited

U.S. PATENT DOCUMENTS

| | | | |
|---|---|---|---|
| 5,493,381 A | * 2/1996 | Lange et al. | 399/344 |
| 5,502,575 A | * 3/1996 | Kai et al. | 358/405 |
| 5,533,144 A | 7/1996 | Fan | 382/135 |
| 5,659,628 A | * 8/1997 | Tachikawa et al. | 382/135 |
| 5,678,155 A | * 10/1997 | Miyaza | 399/366 |
| 5,850,581 A | * 12/1998 | Roller | 399/2 |
| 6,014,453 A | * 1/2000 | Sonoda et al. | 382/137 |
| 6,289,125 B1 | * 9/2001 | Katoh et al. | 382/194 |
| 6,370,271 B2 | * 4/2002 | Fu et al. | 382/217 |
| 6,516,078 B1 | * 2/2003 | Yang et al. | 382/100 |

FOREIGN PATENT DOCUMENTS

| | | | |
|---|---|---|---|
| EP | 0 751 663 A2 | 1/1997 | H04N/1/00 |
| EP | 1 049 317 A2 | 11/2000 | H04N/1/00 |
| EP | 1 073 253 A2 | 1/2001 | H04N/1/00 |
| WO | WO 00 67464 A | 11/2000 | H04N/1/40 |

* cited by examiner

Primary Examiner—Andrew W. Johns
Assistant Examiner—Shervin Nakhjavan
(74) Attorney, Agent, or Firm—Perman & Green, LLP

(57) ABSTRACT

An anticounterfeit detector (ACD) apparatus and method scans an object to be printed and has a validation code or "ticket" added to the resulting video signal at a first location, e.g., a personal computer, only a selected image, e.g., currency or negotiable securities are not detected. Alternately, or in addition to, when the selected image is detected, the video signal is invalidated. A printer located at a second location separate from the first location prints only when the ticket is present or prints the invalidated video signal. The printer can be a stand alone one or part of some other machine. Further, the printer can be of any type, e.g. xerographic, ink jet, etc.

22 Claims, 2 Drawing Sheets

ANTI-COUNTERFEIT DETECTION FOR LOW END PRODUCTS

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

The present invention relates to anti-counterfeit detection (ACD) of currency or negotiable securities, and more particularly, to such detection as used in inexpensive xerographic copiers and printers for personal computers (PC).

2. Description of the Related Art Including Information Disclosed Under 37 CFR 1.97 and 1.98

ACD hardware and software is known from U.S. Pat. No. 5,533,144, hereby incorporated by reference.

In high-end copiers and printers, the cost of providing a hardware solution for ACD is not a major factor. However, in low-end products, a hardware addition, e.g., costing $100.00, may double the cost of the device. Similarly, in low-end multifunction, e.g. copier, printer and facsimile, machines which have a scanner, the scanner provides a quick first copy out time by scanning and printing at the same time. In such machines, providing ACD can also be expensive. In particular, in order to accomplish this, internal buffers will have to be maintained which capture the high resolution data to delay printing so that even partial printing is avoided. These size of these buffers will be dictated by the amount of data needed by the ACD algorithms.

It is therefore desirable to have a method and an apparatus for performing ACD that is inexpensive.

BRIEF SUMMARY OF THE INVENTION

A process comprises detecting at first location if a video signal represents a selected type of image; receiving said video signal at a second location separated from said first location, and printing an image from said video signal at said second location if said video signal does not represent said selected type of image.

An apparatus comprises a detector for determining if a video signal represents a selected type of image and a corrector taking corrective action if said video signal represents said selected type of image.

An apparatus disposed at a second location for receiving a video signal from a first location comprises a detector receiving said video signal and determining the presence of a validity code, and a printer printing a reproduction of said video signal only when said validity code is present.

BRIEF DESCRIPTION OF THE SEVERAL VIEWS OF THE DRAWING(S)

DETAILED DESCRIPTION OF THE INVENTION

Figure 1:
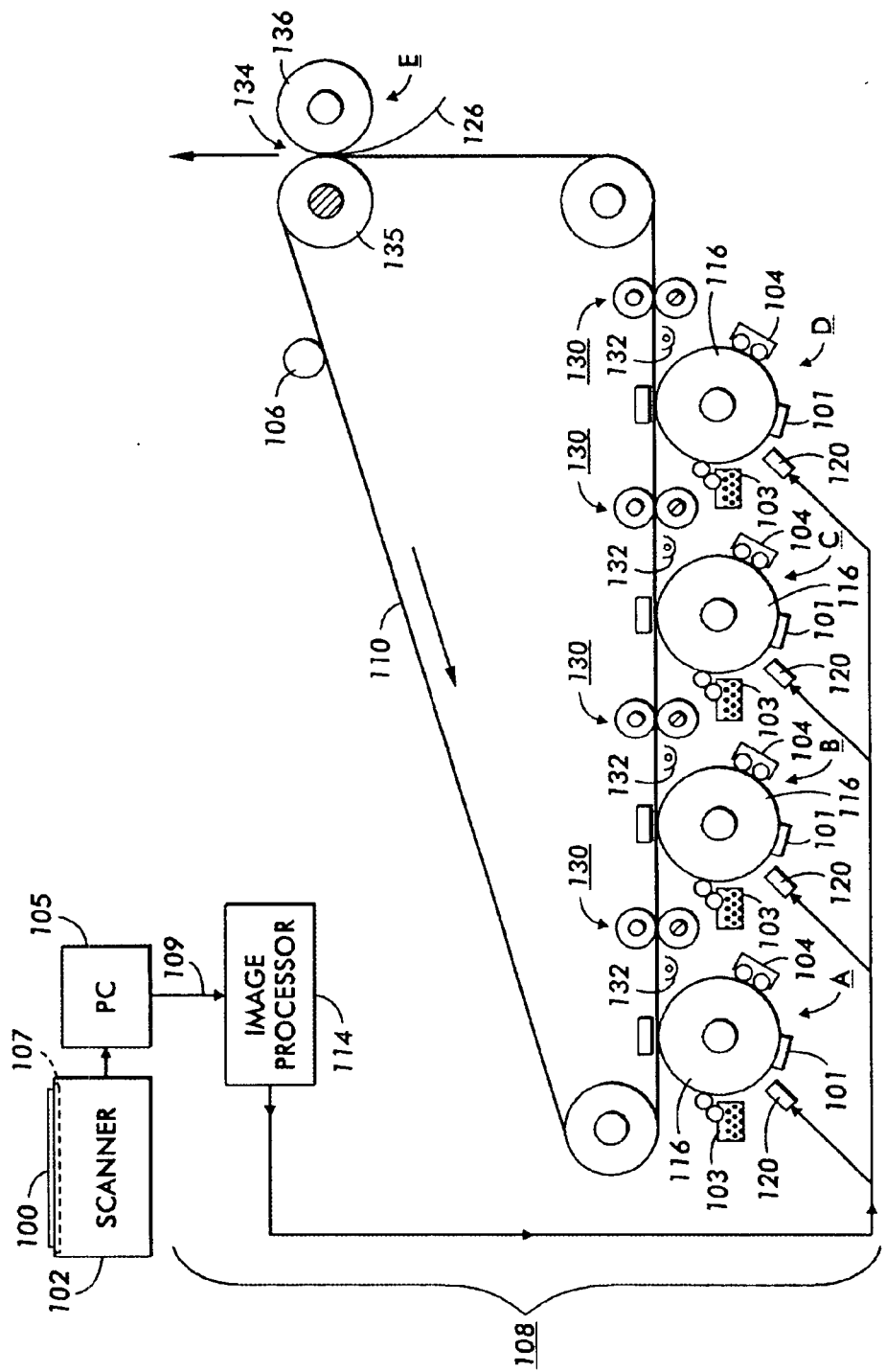
FIG. 1 is a block diagram of an embodiment of the invention.

FIG. 1 shows an embodiment, wherein a document 100 is disposed on a platen 107 of a flatbed scanner 102, which scanner can be a stand alone one or part of a system, e.g., xerography apparatus. Scanner 102 can also be any other type of imaging device, e.g., a camera having a CCD imager. Scanner 102 provides a video signal to a personal computer (PC) 105, which normally has print driver software (described below) in it. PC 105 is located at a first location. It will be understood that PC 105 need not be a personal one, e.g. it could be a mainframe computer. A printer 108, e.g., a local printer, a network printer, etc., is coupled to PC 105 by transmission means, e.g., cable 109, a radio frequency transmitter (not shown), local area network, etc., in order to receive an analog or digital video signal of any type. This printer 108 can be an independent printer or be a part of a xerographic or non-xerographic, e.g., ink jet, copier or facsimile (fax) machine. Printer 108 is located at a second location, i.e., it is not in the same enclosure (not shown) as PC 105.

The details of one possible embodiment of printer 106 are substantially the same as shown in U.S. Pat. No. 5,991,201. An image processor 114 generates a color image. Digital signals which represent the blue, green and red density signals of the image are converted in the image processing unit into four bitmaps: yellow (Y), cyan (C), magenta (M), and black (K). The bitmap represents the values of the exposure required for each color component of the pixel. Image processor 114 may contain a shading correction unit, an undercolor removal unit (UCR), a masking unit, a dithering unit, a gray level processing unit, and other imaging processing sub-systems known in the art. The image processor 114 can store bitmap information for subsequent images or can operate in a real time mode.

At stage A, toner of a first color is formed on either a belt or drum 116. The photoconductive member is preferably a drum of the type which is typically multilayered and has a substrate, a conductive layer, an optional adhesive layer, an optional hole blocking layer, a charge generating layer and a charge transport layer (none shown). The drum is charged by charging unit 101. Raster output scanner (ROS) 120, controlled by image processor unit 114, writes a first color image by selectively erasing charges on the drum 116. The ROS 120 writes the image information pixel by pixel. It should be noted that either discharged area development (DAD) can be employed in which discharged portions are developed or charged area development (CAD) can be employed in which the charged portions are developed with toner. After the electrostatic latent image has been recorded, drum 116 advances the electrostatic latent image to development station 103. Dry developer material is supplied by development station 103 to develop the latent image. In the case of CAD development, the charge of the toner particles is opposite in polarity to the charge on the photoconductive surface, thereby attracting toner particles thereto. The latent image is developed with a less than monolayer coverage of toner particles. On the average, the uniformity of the development is such that toner particles are near neighboring toner particles. Development station 103 employs small size toner, preferably having average particles size of about 5 $\mu$m.

The developed image is electrostatically transferred to the compliant, low surface energy intermediate member 110 by applying an electrical bias between the drum 116 and intermediate member or belt 110. Any residual toner on the drum 116 is removed with a cleaner 104. Intermediate member 110 may be either a roll or an endless belt with a conductive substrate and a compliant overcoat. The path of the belt is defined by a plurality of internal rollers. An optional plurality of heating elements 132 are in close proximity to the toned image such that the heat causes the toner particles present on the surface to soften. The softened toner particles pass through a film layer formation station 130. Station 130 includes a heated roller (not shown) which is in contact with the softened toner image and a backup pressure roll (not shown) behind intermediate member 110. Filming station 130 spreads the softened toner particles into a thin film so that the small gaps between neighboring toner particles are covered with toner without degradation of the image. The toner flow required is very small to cover the spaces between the toner particles. Ideally, the film forming station should form a film of the desired thickness (about 1 $\mu$m) regardless of the local toner coverage. One possible way of achieving this is to make the heated roller self-spaced from the intermediate belt 110 at the desired thickness. One method for achieving this requirement would be to utilize a gravure-type roll for the heated roller (not shown).

At stage B illustrated in FIG. 1, formation of a second color takes place in the same manner as described above. The drum 116 is charged with charging unit 101, and then it is exposed by ROS 120 according to second color image bitmap information. After the electrostatic latent image has been recorded, drum 116 advances the electrostatic latent image to development station 103. Dry developer material with toner of the second color is supplied by development station 103 to develop the latent image.

The developed image is electrostatically transferred to the intermediate member 110 by an electrical bias voltage between drum 116 and belt 110. (Any residual toner on drum 116 is cleaned by cleaner 104). The developed second color image is superimposed on the previous first color image. Heat from the optional heater 132 softens the toner particles. The softened toner particles on the intermediate member 110 pass through the heated filming station 116, which spreads the softened image into a thin film without degradation of the image.

The process is repeated for the next two colors at stages C and D. A multi-layer film image is formed by superimposing black, yellow, magenta, and cyan toners. The full color advances to transfusing stage E.

At transfuse nip 134 illustrated in FIG. 1, the multi-layer full-color film image is transfused to the recording sheet or paper 126 by the application of heat and pressure between a heated roll 135 behind the intermediate belt 110 and a backup pressure roll 136 behind the recording sheet. Moreover, recording sheet 126 may have a previously transferred toner image present on the back surface thereof as the result of a prior imaging operation, i.e. duplexing. As the recording sheet 126 passes through the transfuse nip 134, the multi-layer toner film adheres to the surface of the recording sheet 126, and due to greater attractive forces between the paper 126 and toner film, as compared to the attraction between the toner film and the low surface energy surface of the compliant intermediate member 110, the multilayer toner film is transferred to the recording sheet 126 as a full-color image. The transfused image becomes permanent once it advances past the transfuse nip 134 and is allowed to cool below the softening temperature of the toner materials. The cycle for forming another document is initiated following the cleaning of any residual toner from the intermediate belt 110 by cleaner 106.

Of course, for monochrome (black and white) printing only a single station is needed and processor 114 would only provide a monochrome signal.

Figure 2:
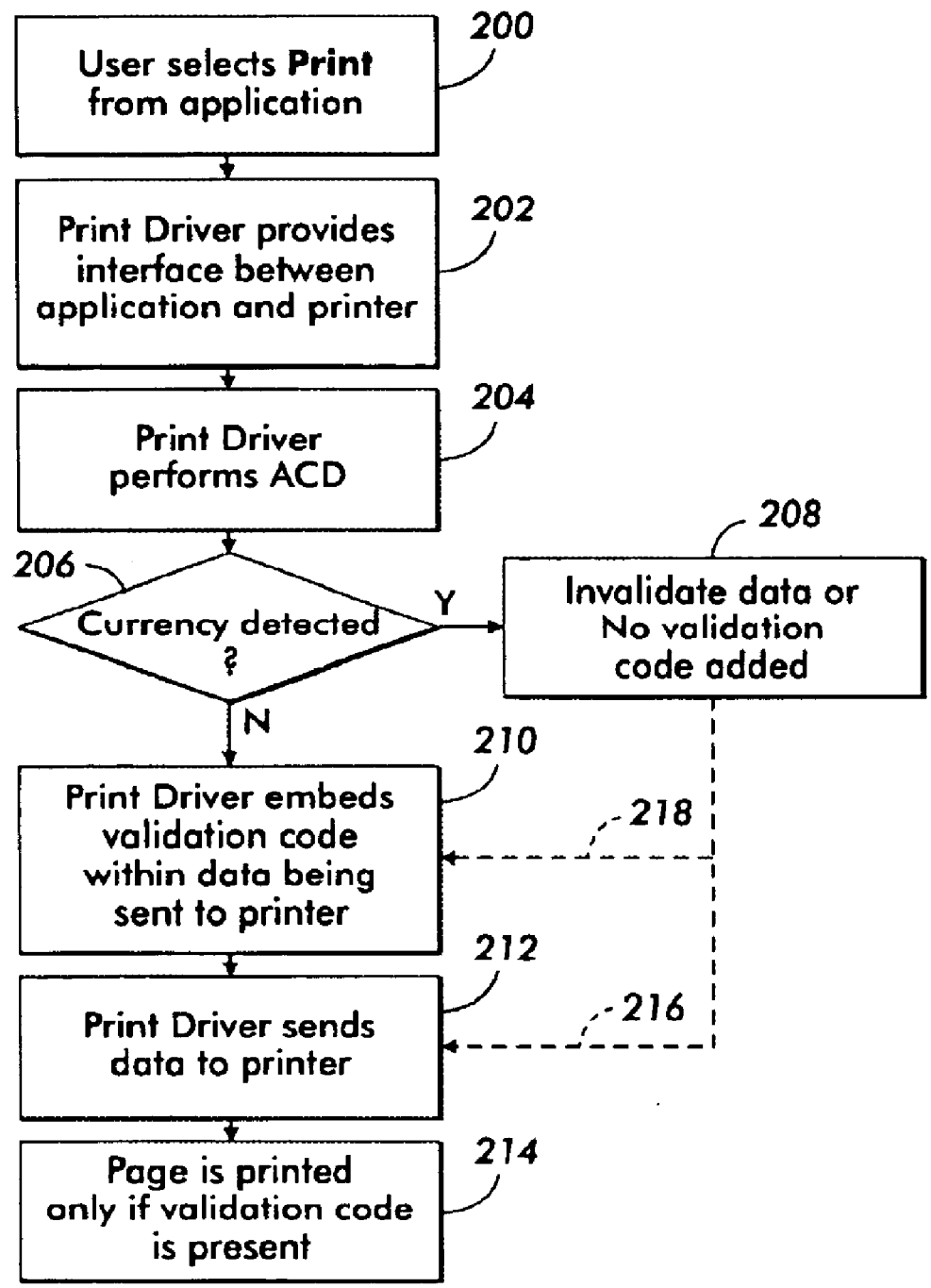
FIG. 2 is a flow chart of the operation of FIG. 1.

Now considering the ACD operation, software performing the operation of the flow chart of FIG. 2 is normally in the print driver of PC 105, but can be otherwheres, e.g., in software of scanner 102, or in other software of PC 105. In particular, the optional last step 214 is done at printer 108. This does not appreciably increase the cost of printer 108. In FIG. 2, at step 200 a user selects the PRINT application, e.g., by clicking on a PRINT icon (not shown) on PC 105. Step 202 shows that the print driver software provides an interface between the application and the printer, e.g., provides signals in properly formatted form to image processor 114.

At step 204 the print driver performs ACD, e.g., as shown in U.S. Pat. No. 5,533,144, hereby incorporated by reference. Any other software or hardware ACD methods and devices can be used. At decision 206 it is determined if currency and/or other selected image, e.g., negotiable securities such as stocks and bonds, are detected. If no selected image is detected, then step 210 shows that a validation code ("ticket") is added to the video data. The validation code added to the document may use one of several known methods. One method is to keep the validation code separate and distinct from the document data. In this case, it would be necessary for the validation code to be encrypted using methods as known in the art of encryption such that adding validation codes outside the scope of the ACD system in order to print a counterfeit would be non-trivial. Another method is to embed the validation code within the actual digital data of the document using methods known such as in digital watermarking.

At step 212 the print driver sends the video data to printer 108. An image from the video data is printed only if the ticket is present as shown at step 214. It is noted that step 214 is performed in image processor 114, provided such processor has the hardware or software for doing this. However, most current printers do not have this software and will therefore print even if no ticket is present. If YES at decision 206, then the video data or signal is invalidated and/or no ticket is added by the printer driver at step 208. Invalidation of the video signal by altering the data to be printed is shown by line 216. The altered data causes the printer 108 to not properly print, e.g., print "INVALID", print in only one color etc. Thus, even if a printer does not have optional step 214, a counterfeit will not be printed. If the validation code is not added as shown by line 218, the missing ticket causes printer 108 to not print, preferably not even a partial image is printed. Of course, both invalidating the data and not adding a ticket can both be performed on the same video signal for extra security.

It will be appreciated that in the present invention the ACD software and/or hardware is located at a first location, e.g., a PC, where the ACD cost can be readily absorbed. This first location is separate from the printer, which is at a second location. Since the ACD is not in the printer, the cost of the printer is not increased.

While the present invention has been particularly described with respect to preferred embodiments, it will be understood that the invention is not limited to these particular preferred embodiments, the process steps, the sequence, or the final structures depicted in the drawings. On the contrary, it is intended to cover all alternatives, modifications, and equivalents as may be included within the spirit and scope of the invention defined by the appended claims. In addition, other methods and/or devices may be employed in the method and apparatus of the instant invention as claimed with similar results.

What is claimed is:

1. A process comprising:
   detecting at a first location if a video signal represents a selected type of image;

receiving said video signal at a second location not in the same enclosure as said first location;

printing an image from said video signal at said second location if said video signal does not represent said selected type of image;

taking corrective action if said video signal represents said selected type of image;

wherein said corrective action comprises both invalidating said video signal and stopping said printing step, adding to said video signal a validation code at said first location if said video signal does not represent said selected type of image, and checking at said second location for said validatin code.

2. The process of claim 1, wherein said selected type of image represents a member of a group consisting of currency and negotiable securities.

3. The process of claim 1, wherein said detecting step comprises scanning an object at said first location to produce said video signal.

4. The process of claim 1, wherein said printing step comprises xerographically printing.

5. The process of claim 1, wherein said printing step comprises ink jet printing.

6. The process of claim 1, wherein said stopping step prevents printing even a partial image.

7. The process of claim 1, wherein said validation code is separate from the video signal.

8. The process of claim 1, wherein said validation code is embedded in the video signal.

9. An apparatus comprising:

a detector at a first location for determining if a video signal represents a selected type of image; and a corrector at said first location and at a second location taking corrective act if said video signal represents said selected type of image, said locations not being in the same enclosure;

a printer at said second location for printing an image from said video signal;

wherein said corrector comprises both an adder adding a validation code to said video signal if said video signal does not represent said selected type of image, said adder being disposed at said first location, and an invalidator at said first location altering said video signal, and means at said second location for stopping printing of said image if said validation code is not present.

10. The apparatus of claim 9, wherein said validation code is separate from the video signal.

11. The apparatus of claim 9, wherein said validation code is embedded in the video signal.

12. The apparatus of claim 9, wherein said selected type of image represent a member of a group consisting of currency and negotiable securities.

13. The apparatus of claim 9, further comprising a scanner scanning an object to provide said video signal.

14. An apparatus disposed at a second location for receiving a video signal from a first location, said locations not being in the same enclosure, said apparatus comprising:

a detector receiving said video signal and determining the presence of a validity code when said video signal does not match a selected type of image, said video signal also being invalidated if said video signal matches said selected type of image; and a printer printing a reproduction of said video signal only when said validity code is present.

15. The apparatus of claim 14, wherein said printer comprises a xerographic printer.

16. The apparatus of claim 14, wherein said printer comprises an ink jet printer.

17. The apparatus of claim 14, wherein said printer does not print even a partial image if said video signal represents said selected type of image.

18. A xerographic printer disposed at a second location comprising:

at least one station applying a video signal from a first location to a member, said locations not being in the same enclosure, said video signal being invalidated if said video signal matches a selected type of image; and an image processor receiving said video signal and providing it to said station only when a validation code is present, said validation code being present only when said video signal does not match said selected type of image.

19. The printer of claim 18, wherein said validation code is present only when said video signal does not represent a member of a group consisting of currency and negotiable securities.

20. The printer of claim 18, wherein said processor does not provide even a partial video signal when said code is not present.

21. The printer of claim 18, wherein said station includes a scanner coupled to said processor, a drum disposed proximate said scanner, a development station disposed proximate said drum, and a cleaner disposed proximate said drum.

22. The printer of claim 18, further comprising a plurality of stations each of said stations receiving a color component signal of said video signal.

* * * * *